(12) United States Patent
Lan

(10) Patent No.: US 8,542,701 B2
(45) Date of Patent: Sep. 24, 2013

(54) METHOD AND DEVICE FOR DETERMINING TIMESLOT CONFIGURATION IN TDM TRANSMISSION

(71) Applicant: Huawei Technologies Co., Ltd., Shenzhen (CN)

(72) Inventor: Haiqing Lan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/725,218

(22) Filed: Dec. 21, 2012

(65) Prior Publication Data

US 2013/0121344 A1  May 16, 2013

Related U.S. Application Data

(63) Continuation of application No. PCT/CN2011/082222, filed on Nov. 15, 2011.

(51) Int. Cl.
*H04L 12/43* (2006.01)
*H04L 12/66* (2006.01)

(52) U.S. Cl.
USPC .......................................... 370/458

(58) Field of Classification Search
None
See application file for complete search history.

(56) References Cited

U.S. PATENT DOCUMENTS

| | | | |
|---|---|---|---|
| 2002/0080829 A1* | 6/2002 | Ofek et al. | 370/539 |
| 2002/0131408 A1* | 9/2002 | Hsu et al. | 370/355 |
| 2002/0141411 A1* | 10/2002 | Oh | 370/392 |
| 2004/0136401 A1* | 7/2004 | Ichino | 370/473 |
| 2004/0190548 A1* | 9/2004 | Harel et al. | 370/466 |
| 2006/0133411 A1* | 6/2006 | Denton et al. | 370/463 |
| 2006/0203797 A1* | 9/2006 | Abrol et al. | 370/349 |
| 2007/0140271 A1* | 6/2007 | Amante et al. | 370/401 |
| 2007/0280251 A1* | 12/2007 | Wang et al. | 370/395.1 |
| 2010/0080212 A1 | 4/2010 | Krstulich | |

FOREIGN PATENT DOCUMENTS

| | | |
|---|---|---|
| CN | 101052021 A | 10/2007 |
| CN | 101136787 A | 3/2008 |
| CN | 102223684 A | 10/2011 |

OTHER PUBLICATIONS

Network Working Group, "PPP in HDLC-like Framing" Daydreamer, Jul. 1994, 27 pages.
International Search Report and Written Opinion received in International Application No. PCT/CN2011/082222, received Aug. 23, 2012, 10 pages.

* cited by examiner

*Primary Examiner* — Chirag Shah
*Assistant Examiner* — Srinivasa Reddivalam
(74) *Attorney, Agent, or Firm* — Slater & Matsil, L.L.P.

(57) ABSTRACT

The present invention provides a method and a device for determining timeslot configuration in TDM transmission. The method includes: receiving consecutively transmitted TDM frames, wherein at least one TDM frame among the consecutively transmitted TDM frames includes a characteristic word; and according to a case of a timeslot collection occupied by the characteristic word in the TDM frame, determining a timeslot collection configured in the TDM frame for HDLC frames, wherein the characteristic word is configured to match a physical layer rate when no peer-peer protocol, PPP, link setup request packets are transmitted. Embodiments of the present invention are able to realize automatic acquisition of timeslot configuration of TDM frames.

21 Claims, 8 Drawing Sheets ized mode. That is, each E1 frame is consisted of 32 timeslots.
METHOD AND DEVICE FOR DETERMINING TIMESLOT CONFIGURATION IN TDM TRANSMISSION This application is a continuation of International Application No. PCT/CN2011/082222, filed on Nov. 15, 2011, which is hereby incorporated by reference in its entireties.

TECHNICAL FIELD

The present invention relates to a network communications technology, and in particular, to a method and a device for determining timeslot configuration in Time Division Multiplexing (TDM) transmission.

BACKGROUND

In the Internet Protocol (IP) era, it is often using the TDM transmission technology as the IP bottom layer bearer. TDM transmission technologies include E1, T1, and J1.

E1 is taken for example. Generally, E1 works in channelized mode. That is, each E1 frame is consisted of 32 timeslots. Except timeslot 0 which is used for synchronization and maintenance, all or certain of timeslot 1 to timeslot 31 may be used to bear IP data. When E1 is working in the channelized mode, IP data is borne on the channelized E1 (IPover channelized E1 for short). The corresponding protocol stack is IP/Peer-Peer Protocol (PPP)/High level Data Link Control (HDLC)/channelized E1. That is, IP packets are borne by PPP frames. PPP frames are borne by HDLC frames, and are mapped to specified timeslots of E1 frames. At this time, the timeslots used for transmitting HDLC frames must be specified in the devices at both ends that use E1 communication, thereby HDLC frames are normally sent and received, negotiation of PPP frames is accomplished, and IP packets are normally transmitted.

In the prior art, timeslots for E1 frames used by the HDLC frames may be pre-configured in the devices at both ends. However, the pre-configuration solution requires much human participation and results in heavy workload and poor efficiency.

SUMMARY OF THE INVENTION

Embodiments of the present invention provide a method and a device for determining timeslot configuration in TDM transmission to realize automatic recognition and configuration of timeslot configuration for TDM frames.

An embodiment of the present invention provides a method for determining timeslot configuration in TDM transmission, including receiving consecutively transmitted TDM frames, where at least one TDM frame among the consecutively transmitted TDM frames includes a characteristic word, and according to a case of a timeslot collection occupied by the characteristic word in the TDM frame, determining a timeslot collection configured in the TDM frame for high level data link control HDLC frames, where the characteristic word is configured to match a physical layer rate when no peer-peer protocol (PPP) link setup request packets are transmitted.

An embodiment of the present invention provides a device for determining timeslot configuration in TDM transmission, including a receiving module, configured to receive consecutively transmitted TDM frames, where at least one TDM frame among the consecutively transmitted TDM frames includes a characteristic word, and a determining module, configured to determine, according to a case of a timeslot collection occupied by the characteristic word in the TDM frame, a timeslot collection configured in the TDM frame for high level data link control HDLC frames, where the characteristic word is configured to match a physical layer rate when no peer-peer protocol (PPP) link setup request packets are transmitted.

From the above technical solutions, it may be known that the embodiments of the present invention, by detecting M received TDM frames, and determining a timeslot collection configured for HDLC frames according to a timeslot collection occupied by a first characteristic word in a first TDM frame, are able to realize self-discovery of timeslots, and avoid problems caused by manual pre-configuration.

BRIEF DESCRIPTION OF THE DRAWINGS

To better illustrate the technical solution in the embodiments of the present invention, the drawings that need to be used in the description of the embodiments will be described simply below. Apparently, the drawings described below are some embodiments of the present invention. Those ordinary skilled in the art are able to obtain other drawings based on these drawings without innovative work.

DETAILED DESCRIPTION OF ILLUSTRATIVE EMBODIMENTS

To clarify the purpose, technical solutions and advantages of the embodiments of the present invention, the technical solutions in the embodiments of the present invention will be described clearly and completely below with reference to the drawings in the embodiments of the present invention. Evidently, the embodiments described are only a part but not all of the embodiments of the present invention. All the other embodiments obtained by those ordinary skilled in the art without creative work based on the embodiments of the present invention are all within the protected scope of the present invention.

The technology of determining timeslot configuration in TDM transmission proposed in an embodiment of the present invention is a timeslot configuration self-discovery technology. This new technology may be called intelligent TDM user block exploration (i-tube) technology. A functional unit that specifically executes this technology may be called timeslot configuration self-discovery unit, and a unit that is configured to trigger execution of the timeslot configuration self-discovery unit may be called i-tube control unit.

On the other hand, the embodiments of the present invention will take a case where the TDM technology is E1 technology as an example. During E1 transmission, a unit that encapsulates IP packets into PPP frames, then encapsulates PPP frames into HDLC frames, and then maps HDLC frames to E1 frames for transmission is called PPP/HDLC/E1 unit (also called transceiver unit). The transceiver unit may include a timeslot configuring sub unit and transceiving sub unit.

Figure 1:
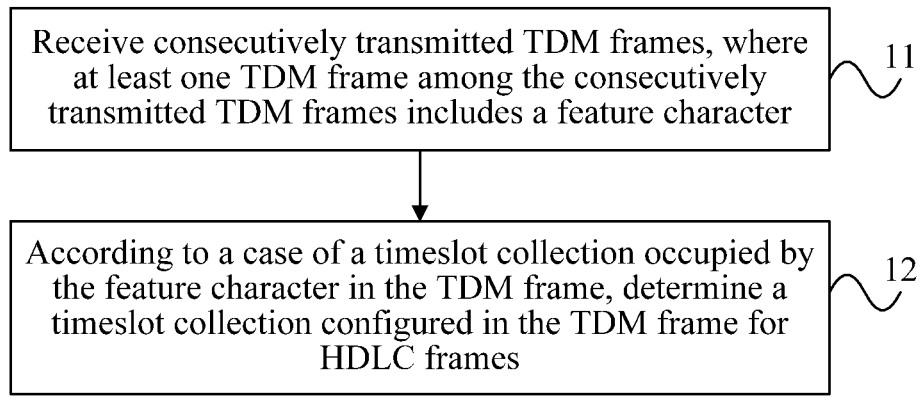
FIG. 1 is a schematic flowchart of a method according to a first embodiment of the present invention.

FIG. 1 is a schematic flowchart of a method according to a first embodiment of the present invention, including:

Step 11: Receive consecutively transmitted TDM frames, where at least one TDM frame among the consecutively transmitted TDM frames includes a characteristic word.

Step 12: According to a case of a timeslot collection occupied by the characteristic word in the TDM frame, determining a timeslot collection configured in the TDM frame for HDLC frames, where the characteristic word is configured to match a physical layer rate when no peer-peer protocol (PPP) link setup request packets are transmitted.

Optionally, the determining a timeslot collection configured in the TDM frame for high level data link control HDLC frames according to a case of a timeslot collection occupied by the characteristic word in the TDM frame may include: if a second TDM frame exists, the second TDM frame includes only one same characteristic word, and a timeslot collection occupied by the included same characteristic word is the same as the timeslot collection configured for HDLC, then determining the timeslot collection occupied by the characteristic word in the second TDM frame as a timeslot collection configured in the TDM frame for the HDLC frames.

Optionally, a number of the consecutively transmitted TDM frames is M, M is any set value that is greater than N, and N is a maximum number of TDM frames required for transmitting one whole PPP link setup request; determining a timeslot collection configured in the TDM frame for HDLC frames according to a case of a timeslot collection occupied by the characteristic word in the TDM frame, includes: according to the M TDM frames, determining a first TDM frame and a first characteristic word, where the first TDM frame is a TDM frame that includes the largest number of the same characteristic word, and the first characteristic word is the characteristic word that occurs in the first TDM frame for a largest number of times, and determining a timeslot collection occupied by the first characteristic word in the first TDM frame as a timeslot collection configured in the TDM frame for HDLC frames.

Where, the execution entity of the above method may specifically be a timeslot configuration self-discovery unit or a device where the unit is located. The timeslot configuration self-discovery unit may be located in a device that is configured to determine the timeslot configuration for the E1 frame. For example, when device A needs to determine the timeslot configuration for the E1 frame to normally receive and send data, the timeslot configuration self-discovery unit may be located in device A. The determining timeslot configuration for the E1 frame means to determine the timeslots of the E1 frame where an HDLC frame is mapped for transmission.

The consecutively transmitted TDM frames may be sent by a peer end. The peer end means a device that is directly connected through E1 to the device where the timeslot configuration self-discovery unit is located. For example, device A and device B are directly connected through E1, and the timeslot configuration self-discovery unit is located in device A. Then the peer end may be device B.

The direct connection may be a direct connection through optical fiber or direct connection through microwave.

The device A and device B may both be hosts, or one may be a router and the other a host. The host may be a device that is able to be directly connected through TDM technology in Ethernet, for example, a base station, a base station controller, etc.

The PPP link setup request packet is a data packet transmitted during establishment of a PPP connection. In the existing protocol, the length of one PPP link setup request packet is 49 bytes at most, and each E1 frame will at least transmit one byte of PPP information. Therefore, the N is 49. At this time, M may be any value that is greater than or equal to 50. It is understandable that the greater the value of M is, the relatively better the detection effect is. In addition, as the protocol extends, the N corresponding to the PPP link setup request packet may be a value that is equal to or greater than 50.

Where, the case where TDM frames are E1 frames is taken as an example. The frame rate of E1 frames is 8000 frames per second, that is, 8000 E1 frames are able to be transmitted within 1 second. While the period of a PPP link setup request packet is generally longer than 1 second, that is, at most one PPP link setup request packet is sent within 1 second. One PPP link setup request packet occupies at most 49 E1 frames. Then there are 7951 E1 frames that do not transmit PPP information within 1 second. To match the physical layer rate, idle characters need to be inserted into the 7951 E1 frames. The timeslot collection occupied by the idle characters is the timeslot collection configured for HDLC frames.

Idle characters, for example, are 0x7E, which are 01111110 in binary mode. The length is the length of one timeslot of an E1 frame.

When idle characters are inserted, serial shift may occur. For example, the 01111110 becomes 11111100 after shift to the left. The rest may be deduced by analogy, each idle character corresponds to 8 cases. For example, the idle characters 0x7E are taken for example. One case is 01111110, another case is 11111100, still another case is 11111001, . . . . Each case is called a characteristic word. For example, 01111110 is one characteristic word, and 11111100 is one characteristic word. There are totally 8 characteristic words.

As M is greater than N, among the received M TDM frames, at least one TDM frame does not have PPP information, in which a characteristic word replaces an HDLC frame that includes PPP information. In addition, the timeslot collection occupied by the characteristic word is the same as the timeslot collection configured for the HDLC frame. Therefore, the timeslot collection configured for the HDLC frame may be determined according to the timeslot collection occupied by the characteristic word.

Generally, if shift does not exist in idle characters, the timeslot collection configured for the HDLC frame is occupied by a same characteristic word, and the timeslot collection occupied by the same characteristic word may be directly determined as the timeslot collection configured for the HDLC frame.

However, if serial shift exists in the idle characters, two characteristic words may be inserted when one characteristic word is inserted into one E1 frame. At this time, it is can't only determine the timeslot collection occupied by one characteristic word as the timeslot collection configured for the HDLC frame. For example, suppose that the characteristic words included in a first E1 frame are X and Y, and the numbers are 2 and 3 respectively. In addition, according to the current protocol, there is normally no shift exists in the idle characters in subsequent consecutive E1 frames after the first E1 frame. The characteristic word included in the second E1 frame is Y, and the number is 5. Then the E1 frame that includes the largest number of a same characteristic word is the second E1 frame, and the characteristic word which presented in the second E1 frame for the largest number of times is Y. That is, the first TDM frame is the second E1 frame, and the first characteristic word is Y.

For example, the timeslot collection occupied by Y in the second E1 frame is determined as the timeslot collection configured for the HDLC frame.

This embodiment, by detecting M received TDM frames and determining the timeslot collection configured for HDLC frames according to the timeslot collection occupied by the first characteristic word in the first TDM frame, is able to realize self-discovery of timeslots, and avoid problems caused by manual pre-configuration.

Figure 2:
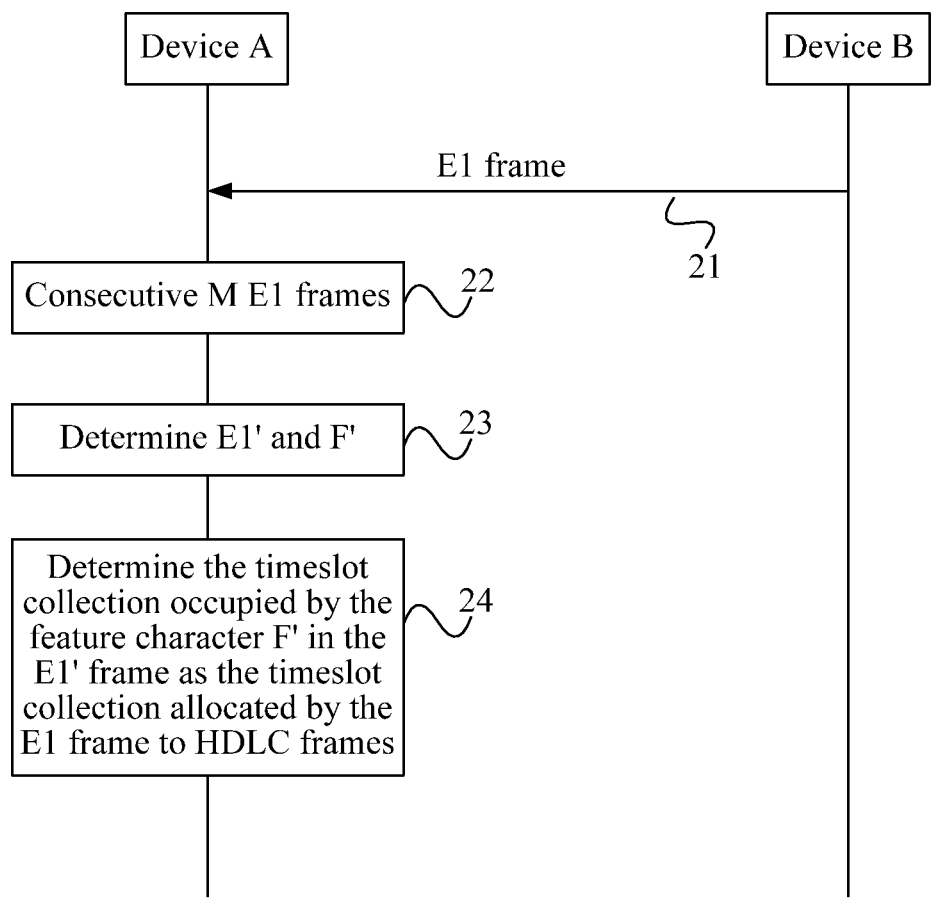
FIG. 2 is a schematic flowchart of a method according to a second embodiment of the present invention.
Figure 3:
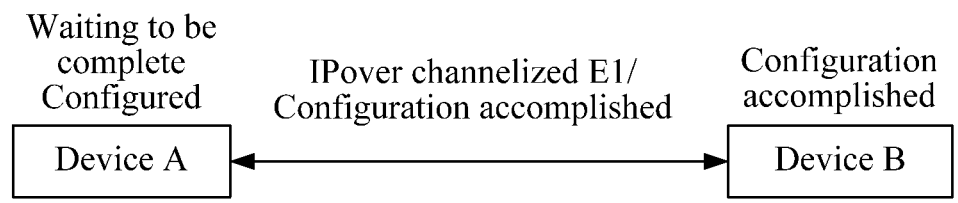
FIG. 3 is a schematic diagram of a system corresponding to FIG. 2.

FIG. 2 is a schematic flowchart of a method according to a second embodiment of the present invention, and FIG. 3 is a schematic diagram of a system corresponding to FIG. 2. Referring to FIG. 3, the application scenario of this embodiment may be as follows: device A and device B are directly connected through IPover channelized E1; E1 timeslot configuration between device A and device B is accomplished; device A is a device whose configuration is to be accomplished, and device B is a device whose configuration has been accomplished, that is, device B is able to normally receive and send HDLC frames according to E1 timeslot configuration, while device A needs to identify E1 timeslot configuration, that is, identify the timeslots in E1 that are used for transmitting HDLC frames, so as to normally receive and send HDLC frames subsequently.

Step 21: Device B maps a PPP link setup request packet to an E1 frame, and sends it to device A.

When the PPP link between device A and device B is not established, device B will periodically send a PPP link setup request packet to device A.

The case where the PPP link between device A and device B is not established includes: initial link setup phase or link re-setup phase after the former link setup does not succeed.

When the PPP link between device A and device B is not established, E1 that bears HDLC frames in one scenario has the following features.

(1) When the PPP link is not established, device B periodically sends a PPP link setup request packet to device A;

(2) The period for sending the PPP link setup request packet is longer than 1 second, and is generally 2 to 5 second, that is, at most one PPP link setup request packet is sent in 1 second;

(3) The length of a PPP link setup request packet is at most 49 bytes;

(4) Since E1 frames will generally use at least one timeslot when they are bearing HDLC frames and one timeslot bears one byte of information, that is, each E1 frame will at least bear one byte of information;

(5) According to (3) and (4), only 49 E1 frames are needed to transmit one whole PPP link setup request packet;

(6) According to (1) and (2), there are at most 49 E1 frames transmit PPP link setup request packets within 1 second;

(7) The frame rate of E1 frames is 8000 frames per second, that is, 8000 E1 frames can be transmitted within 1 second;

(8) According to (6) and (7), there 8000-49=7951 E1 frames that do not transmit PPP information within 1 second;

(9) In the prior art, when no PPP information is sent in HDLC frames, idle characters will be sent in the corresponding timeslot position that bears PPP information in the HDLC frames to match the rate at the physical layer. The idle characters sent in HDLC frames may be 0x7E, which is 01111110 expressed in binary mode. Its length is equivalent to the length of a timeslot in an E1 frame.

(10) According to (8) and (9), there are 7951 frames keeping sending the idle characters 0x7E of HDLC frames within 1 second, that is, there are 7951 E1 frames within 1 second, where the timeslots configured for transmitting PPP/HDLC in each E1 frame only bear and send idle characters 0x7E.

In addition, considering the shift phenomenon of idle characters, the timeslots configured for transmitting HDLC frames (or called PPP/HDLC) in each E1 frame only bear and send idle characters 0x7E or 7 serial shifts of the idle characters 0x7E. The 0x7E and the 7 characters after serial shift serve as 8 characteristic words, that is, there are totally of 8 characteristic words;

(11) When idle characters 0x7E are consecutively sent, the characteristic word borne by the timeslots for transmitting PPP/HDLC in each E1 frame is same;

(12) According to (10) and (11), there are 7951 E1 frames exist within 1 second, and the timeslots where the characteristic words included in each E1 frame located are the timeslots configured by the E1 frame for use by PPP/HDLC. In addition, when the same characteristic word included in a certain E1 frame occurs for the largest number of times, timeslots occupied by the characteristic word that occurs for the largest number of times in the corresponding E1 are timeslots configured by the E1 frame for use by the HDLC frames.

That is, at the PPP link setup phase, the PPP information is transmitted in the timeslots configured by the E1 frame for use by the HDLC frames. When no PPP information is transmitted, the timeslots originally configured for use by the HDLC frames are configured to transmit characteristic words to match the physical layer rate. If there are no problems, such as shift, exist in the idle characters, only a same characteristic word is transmitted in the timeslots configured by each E1 frame for use by the HDLC frames, and the timeslots occupied by the characteristic word may be directly determined as the timeslots configured for the HDLC frames.

However, if shift exists in idle characters, then the timeslots originally configured in one E1 frame for use by the HDLC frames may bear two characteristic words, respectively corresponding to the idle characters before shift and idle characters after shift; on the other hand, when E1 frames are consecutively sent, if different characteristic words (for example, including characteristic word before shift and characteristic word after shift) exist in the current E1 frame, the subsequent consecutive E1 frames will transmit the characteristic word after shift, that is, the subsequent consecutive E1 frames transmit the same characteristic word.

In other words, when no PPP information is transmitted, the timeslots configured in the E1 frame for the HDLC frames are finally used for transmitting the same characteristic words. For example, suppose that the characteristic words included in a first E1 frame are X and Y, and the numbers are 2 and 3 respectively. At this time, the characteristic word included in the consecutive second E1 frame next to the first E1 frame is Y, and the number is 5.

In addition, further optionally, if an accurate timeslot configuration result of the E1 frame is to be obtained, the embodiments of the present invention may require the following: E1 timeslots that do not transmit HDLC frames do not configured to transmit 8 characteristic words, or the E1 timeslots that do not transmit HDLC frames are known in advance, and the E1 timeslots that do not transmit HDLC frames are removed from the result detected through timeslot self-discovery. In other words, the following is required. Characteristic words are only able to be transmitted in the timeslots configured for HDLC frames, or characteristic words are only able to be transmitted in the timeslots configured for HDLC frames and pre-specified timeslots, where the pre-specified timeslots are the above E1 timeslots known in advance that do not transmit HDLC frames; at this time, after one timeslot collection is determined according to the characteristic words, the timeslot collection needs to be deducted by the pre-specified timeslots before serving as the timeslot collection configured for the HDLC frames.

Step 22: Device A receives M E1 frames sent by device B consecutively.

Where, M is any value greater than N, and N is a maximum number of E1 frames required for transmitting one whole PPP link setup request. For example, in the preceding scenario, at most 49 E1 frames are required to transmit one whole PPP link setup request packet, and then M is greater than or equal to 50. Of course, as the protocol extends, the length of a PPP link setup request packet may increase. Generally, suppose that the maximum length of a PPP link setup request packet is L1 bytes, then M is at least L1+1.

Step 23: In the M E1 frames, device A determines the E1 frame that includes the largest number of the same characteristic word and the characteristic word that is occurred in the E1 frame for the largest number of times.

Where, suppose that the E1 frame that includes the largest number of the same characteristic word is E1', and the characteristic word that is occurred in the E1' for the largest number of times is F'.

The above E1' and F' may be determined in following modes.

Solution 1:

1) For each E1 frame, respectively detect the characteristic words and number of times each characteristic word occurs. The characteristic word that occurs for the largest number of times is the characteristic word of this E1 frame, and the number of times the characteristic word occurs in this E1 frame is a number of characteristic word repetition times of this E1 frame;

2) Detect the numbers of characteristic word repetition times for M consecutive non-interrupted E1 frames to find the E1 frame with the largest number of characteristic word repetition times.

Then, the E1 frame that includes the largest number of characteristic word repetition times is E1', and the characteristic word that occurs for the largest number of times in E1' is F'.

Solution 2:

1) For each characteristic word, find the E1 frame which includes the largest number of the characteristic word from M E1 frames;

2) Determine the E1 frame which includes the largest number of a same characteristic word as E1', and determine the characteristic word that occurs in E1' for the largest number of times as F'.

Step 24: Device A determines the timeslot collection occupied by the characteristic word F' in the E1' frame as the timeslot collection configured by the E1 frame for HDLC frames.

Thus, device A determines the timeslots in the E1 frames configured for HDLC frames, and accomplishes timeslot self-discovery of HDLC frames in E1 frames. Further, after determining the E1 timeslot configuration, device A may further: after detecting the timeslot configuration result, device A configure the E1 frame timeslots according to the timeslot configuration result for HDLC frames in the E1 frames to perform high-level PPP negotiation and link setup.

Further, if PPP negotiation succeeds within the specified time, it indicates that the E1 timeslot detection succeeds; otherwise, E1 timeslot detection is deemed as failure, and detection starts again.

By detecting consecutive E1 frames, and determining timeslot configuration according to the characteristic words included in the E1 frames, this embodiment is able to avoid problems caused by manual pre-configuration, realize the self-discovery of E1 timeslot configuration, realize true remote automatic site deployment through IPoverTDM, lower the requirements for preparations before site deployment of remote devices, reduce the requirements for in situ site deployment skills, shorten the site deployment time, and reduce the site deployment cost. Since timeslot self-discovery requires no manual configuration during site maintenance, it is able to realize true remote site maintenance through IPoverTDM. Through timeslot self-discovery, it is able to obtain the timeslot configuration of E1 frames automatically. Further PPP negotiation may be performed according to the automatically obtained timeslot configuration of E1 frames to determine whether the automatically obtained timeslot configuration of E1 frames is correct. When the timeslot configuration of the transmission network changes, the devices at both ends are also able to automatically update device configuration through timeslot self-discovery.

Figure 4:
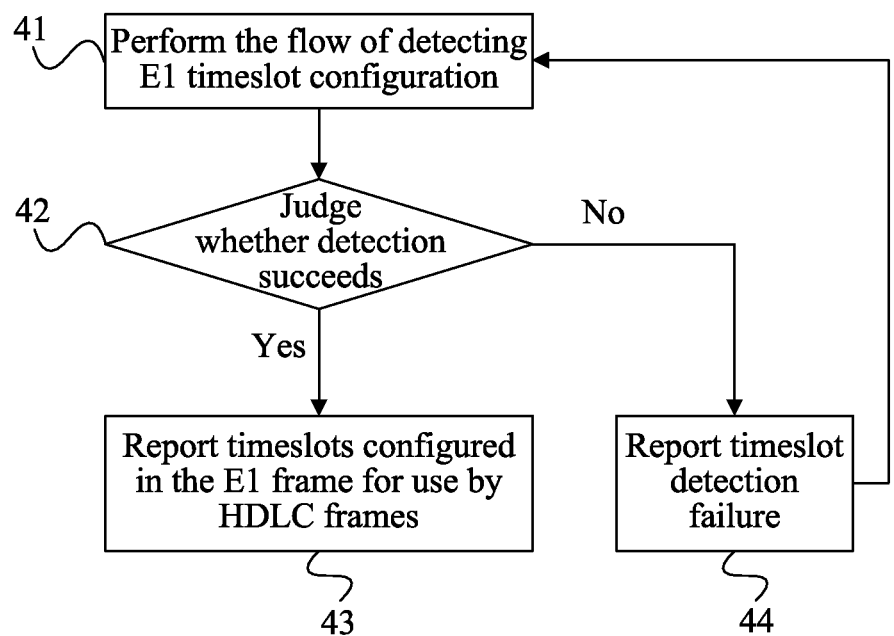
FIG. 4 is a schematic flowchart of a method according to a third embodiment of the present invention.

FIG. 4 is a schematic flowchart of a method according to a third embodiment of the present invention. Different from the second embodiment, this embodiment further reports the detection result. As shown in FIG. 4, this embodiment includes the following steps.

Step 41: The timeslot configuration self-discovery unit performs a flow for detecting the E1 timeslot configuration.

For details, reference may be made to the content of the second embodiment.

Step 42: The timeslot configuration self-discovery unit judges whether the detection succeeds. If yes, go to step 43. Otherwise, go to step 44.

Where, in this embodiment, when device A successfully accomplishes PPP link setup according to the determined timeslot configuration, it indicates that detection succeeds; otherwise, detection does not succeed. For example, device A carries the response information to the corresponding PPP link setup request in the HDLC frame and maps it to the E1 frame according to the determined timeslot configuration. If device B successfully receives the response information, it indicates that link setup succeeds, that is, device A successfully determines timeslot configuration. When device A does not succeed in determining timeslot configuration, carrying the response information will not meet the requirement for timeslot configuration, device B will then not receive the response information, and the PPP link setup between both will fail.

Step 43: The timeslot configuration self-discovery unit reports the timeslots configured in the E1 frame for use by HDLC frames to the timeslot configuring sub unit.

Step 44: The timeslot configuration self-discovery unit reports a detection failure message to the timeslot configuring sub unit.

Then, step 41 and subsequent steps may be executed repeatedly.

This embodiment is able to realize self-discovery of timeslot configuration. In addition, by reporting the detection result, this embodiment is able to provide a more accurate timeslot configuration result to facilitate further management and maintenance.

Figure 5A:
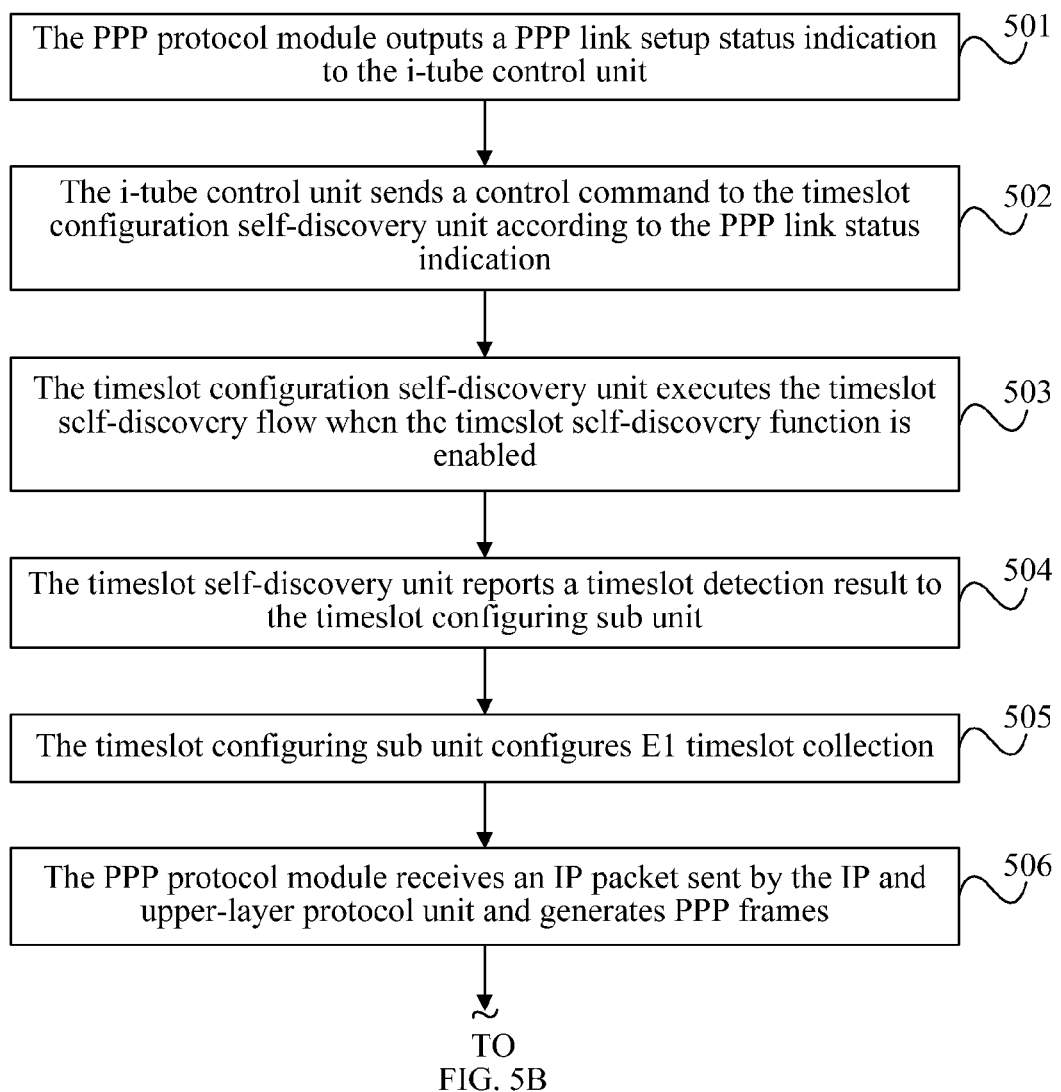
FIG. 5 is a schematic flowchart of a method according to a fourth embodiment of the present invention, the FIG. 5 being divided into two parts of FIG. 5A and FIG. 5B at two consecutive pages, for more clarity to illustrate the schematic flowchart.
Figure 5B:
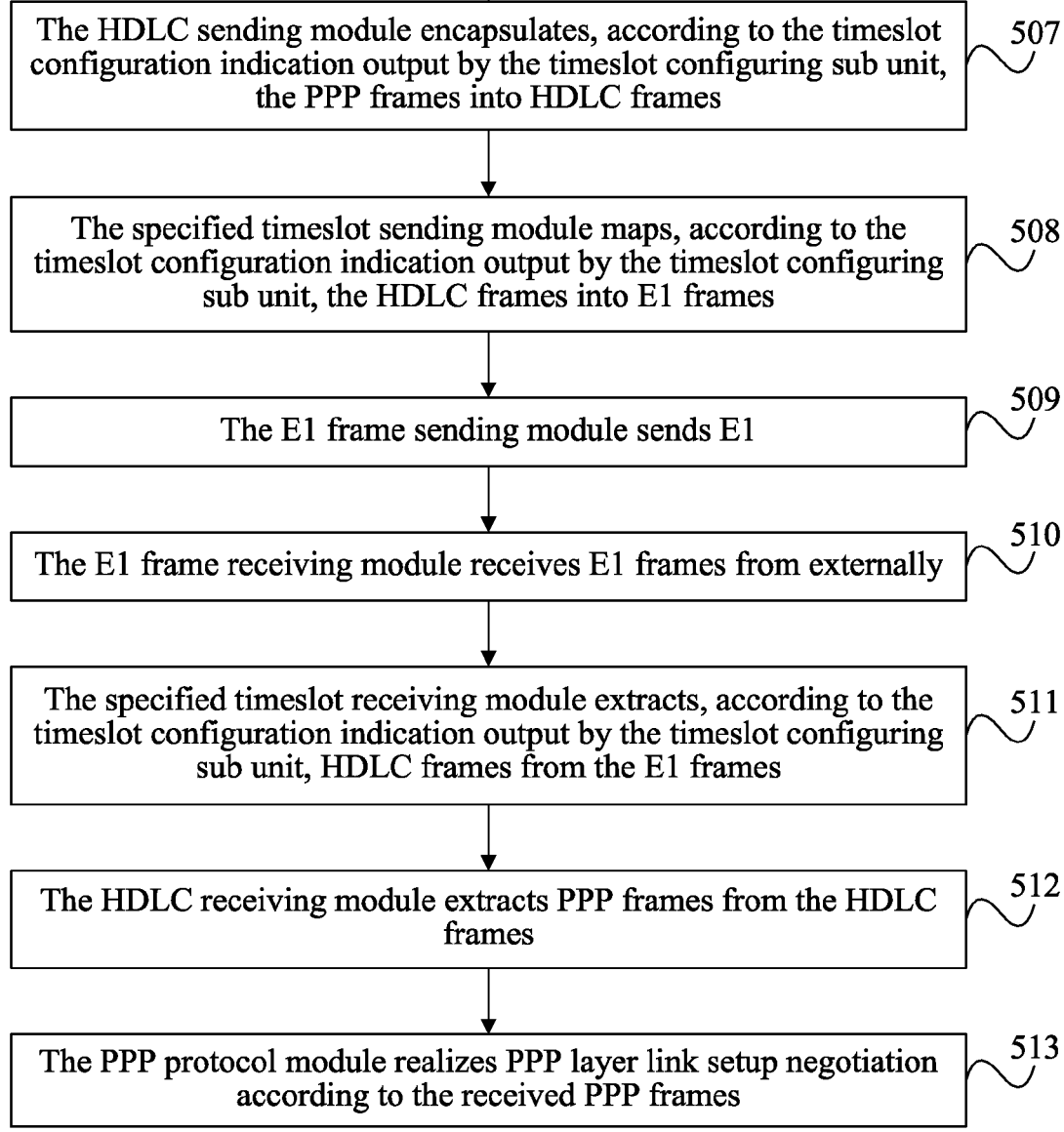
Figure 6:
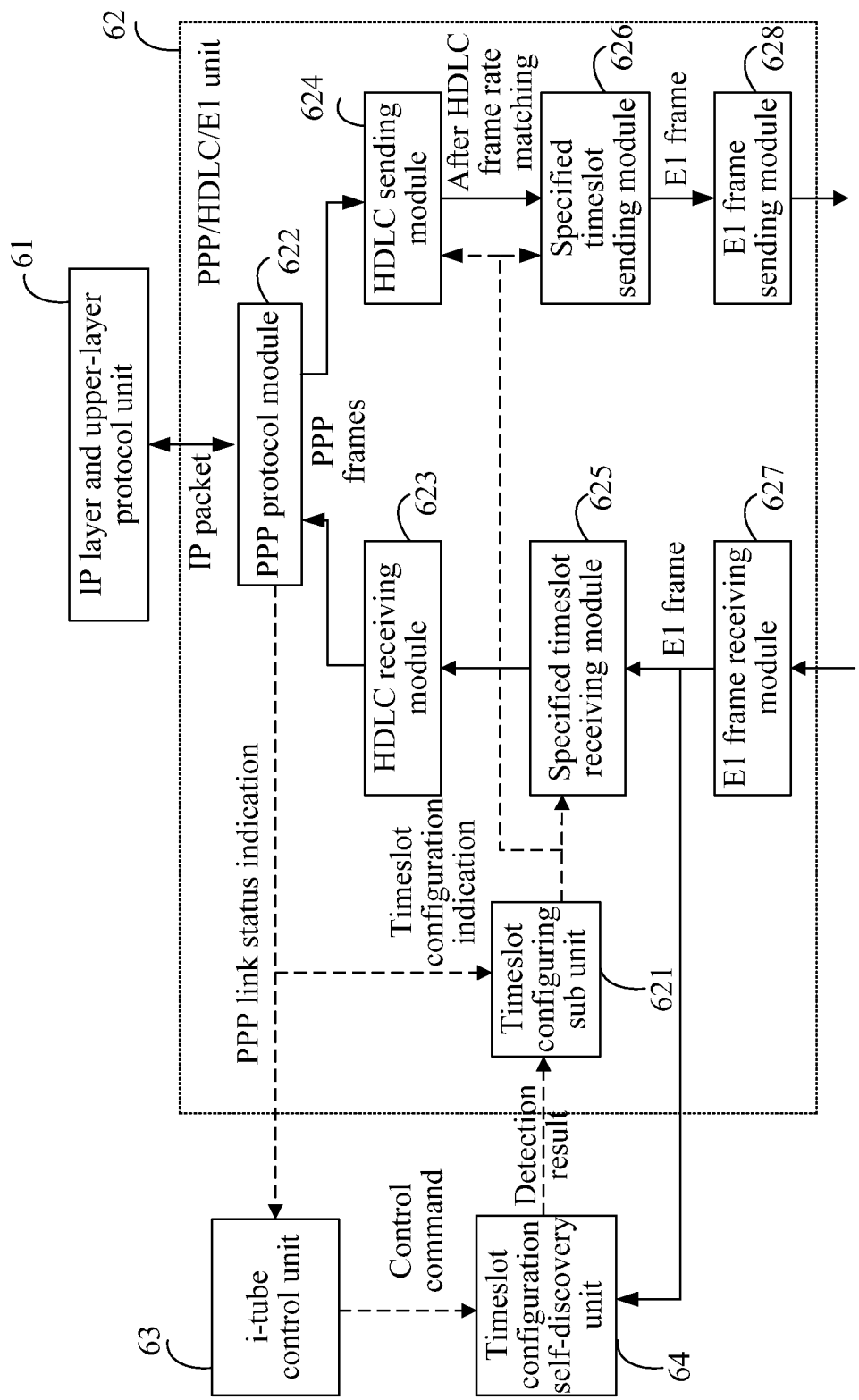
FIG. 6 is a schematic diagram of a system corresponding to FIG. 5.

FIG. 5 is a schematic flowchart of a method according to a fourth embodiment of the present invention, and FIG. 6 is a schematic diagram of a system corresponding to FIG. 5. This embodiment adds, on the basis of the third embodiment, the function of working with normal sending/receiving of PPP/HDLC/E1. The timeslot self-discovery technology is in a loose coupling relationship with the standard PPP/HDLC/E1 so that both parties are able to evolve independently. That is, this embodiment may include: timeslot configuration self-discovery flow and E1 frame sending/receiving flow, where the E1 frame sending/receiving flow may include: E1 frame sending flow and/or E1 frame receiving flow.

As shown in FIG. 5, this embodiment includes from one aspect, the timeslot self-discovery flow is performed, including:

Step 501: A PPP protocol module 622 in a PPP/HDLC/E1 unit 62 outputs a PPP link setup status indication to an i-tube control unit 63.

Where, the PPP link setup status indication may be "not succeed" or "succeed".

Step 502: The i-tube control unit 63 sends a control command to the timeslot configuration self-discovery unit 64 according to the PPP link status indication to enable or disable the timeslot configuration self-discovery unit 64.

For example, if the PPP link status indication is "not succeed", the i-tube control unit controls the timeslot self-discovery unit to enable the timeslot self-discovery function. If the PPP link status indication is "succeed", the i-tube control unit may control the timeslot self-discovery unit to disable the timeslot self-discovery function, or of course, may not control it to disable the function.

Step 503: When enabling the timeslot self-discovery function is enabled, the timeslot configuration self-discovery unit 64 executes the timeslot self-discovery flow.

The timeslot self-discovery flow may be as described in the second embodiment.

Step 504: The timeslot self-discovery unit 64 reports a timeslot detection result to the timeslot configuring sub unit 621.

For example, as described in the third embodiment, when the timeslot detection succeeds, the timeslots configured in the E1 frame for use by HDLC frames are reported. When timeslot detection fails, a timeslot detection failure message is reported.

From another aspect, this embodiment may perform sending of E1 frames, including:

Step 505: The timeslot configuring sub unit 621 configures an E1 frame timeslot collection.

The following modes may be used respectively in different time segments.

1) When the device starts, the PPP/HDLC/E1 unit 62 starts the PPP link setup process, and the timeslot configuring sub unit 621 configures initial E1 timeslot values according to the following modes.

Case 1: If latest E1 timeslot configuration for PPP link setup success is reserved, this E1 timeslot configuration serves as the initial value, and a PPP link setup attempt is made on the basis of this timeslot configuration;

Case 2: If no reserved latest E1 timeslot configuration for PPP link setup success is available, the default configuration serves as the initial value, and a PPP link setup attempt is made on the basis of this timeslot configuration.

2) When PPP link setup does not succeed, after the timeslot configuring sub unit 621 receives the new timeslot configuration data detected and reported by the timeslot configuration self-discovery unit 64, the timeslot configuring sub unit 621 will configure E1 according to the new timeslot configuration data and make a PPP link setup attempt.

3) When PPP link setup succeeds, the timeslot configuring sub unit 621 does not update the E1 timeslot configuration, and uses the current timeslot configuration data to configure E1.

4) When PPP link break occurs after successful link setup, the timeslot configuring sub unit 621 first uses the original timeslot configuration to make a PPP link setup attempt. If PPP link setup is not able to succeed within the specified time, the timeslot configuring sub unit 621 uses the timeslots for timeslot self-discovery to update E1 timeslots and make a PPP link setup attempt.

Step 506: The PPP protocol module 622 receives an IP packet sent from an IP layer and upper-layer protocol unit 61, and generates PPP frames, where the upper-layer protocol unit for example is an application layer protocol unit.

Step 507: An HDLC sending module 624 encapsulates, according to the timeslot configuration indication output by the timeslot configuring sub unit 621, the PPP frames into HDLC frames.

As the HDLC sending module generates an HDLC data stream, and the data stream is a data stream after being matched by a rate that matches the physical layer rate, the HDLC sending module needs to know the timeslot configuration of E1 frames to perform rate matching.

Step 508: A specified timeslot sending module 626 maps, according to the timeslot configuration indication output by the timeslot configuring sub unit 621, the HDLC frames into E1 frames.

Step 509: An E1 frame sending module 628 sends externally the E1 frames.

Where, as this embodiment takes the case where TDM frames are E1 frames as an example, the TDM frame sending module in this embodiment is specifically the E1 frame sending module and the TDM frame receiving module is specifically an E1 frame receiving module.

From still another aspect, this embodiment may further perform receiving of E1 frames, including:

Step 510: An E1 frame receiving module 627 receives E1 frames from externally.

Step 511: A specified timeslot receiving module 625 extracts, according to the timeslot configuration indication output by the timeslot configuring sub unit 621, HDLC frames from the E1 frames.

Step 512: An HDLC receiving module 623 extracts PPP frames form the HDLC frames.

Step 513: The PPP protocol module 622 realizes PPP layer link setup negotiation according to the received PPP frames.

The PPP protocol module, HDLC sending module, specified timeslot sending module, TDM frame sending module, TDM frame receiving module, specified timeslot receiving module, and HDLC receiving module may constitute a transceiving sub unit.

The above three aspects may be respectively performed independently. No time sequence restriction exists for the steps among the aspects, so that independent evolution of timeslot self-discovery and data sending/receiving is realized.

Of course, some of the above flows may also be mutually correlated. For example, during timeslot configuration self-discovery, the received E1 frames come from the E1 frame receiving module, that is, after receiving E1 frames, the E1 frame receiving module sends the received E1 frames to the specified timeslot receiving module and timeslot configuration self-discovery unit.

The PPP link status indication output by the PPP protocol module may indicate the i-tube control unit, or may also indicate the timeslot configuring sub unit.

This embodiment is able to realize self-discovery of timeslot configuration. In addition, by reporting the detection result, this embodiment is able to provide a more accurate timeslot configuration result to facilitate further management and maintenance. For example, HDLC frames are mapped and the PPP link protocol is performed according to the success detection result, or after detection fails, detection or configuration is performed again. Further, this embodiment includes the timeslot self-discovery function and data receiving/sending function. Both functions may be independently processed relatively. That is, they are in a loose coupling relationship. Independent evolution of both functions is able to be realized respectively.

Figure 7:
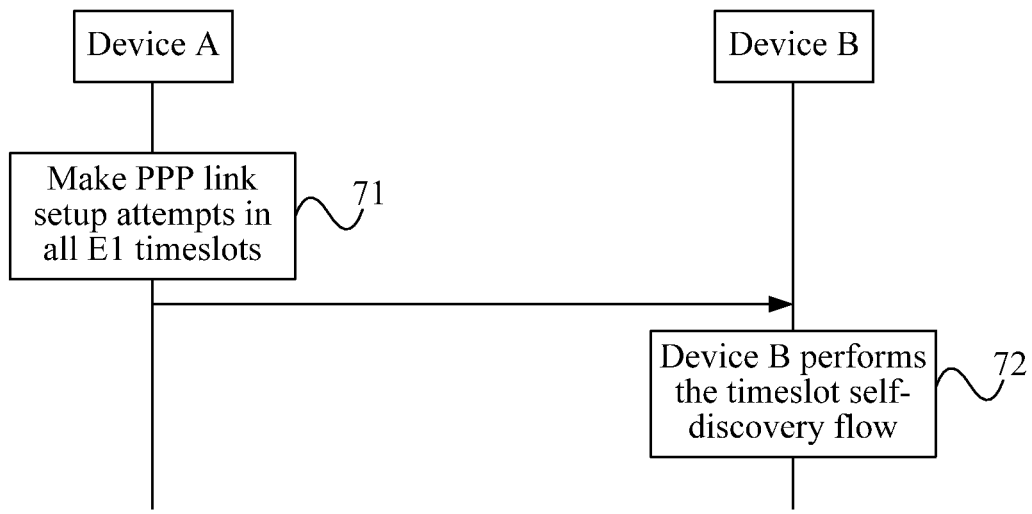
FIG. 7 is a schematic flowchart of a method according to a fifth embodiment of the present invention.
Figure 8:
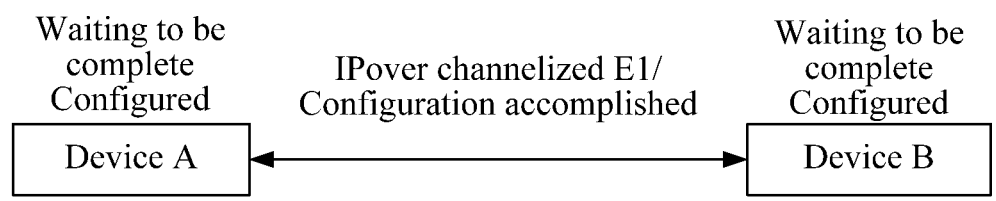
FIG. 8 is a schematic diagram of a system corresponding to FIG. 7.

FIG. 7 is a schematic flowchart of a method according to a fifth embodiment of the present invention, and FIG. 8 is a schematic diagram of a system corresponding to FIG. 7. As shown in FIG. 8, the application scenario of this embodiment may be as follows: Device A and device B are directly connected through IPover channelized E1; E1 timeslot configuration between device A and device B has been accomplished; device A and device B are devices waiting to be configured.

As neither device A nor device B in this embodiment has been complete configured, both device A and device B need to determine timeslot configuration. In this embodiment, at least one device is required to make PPP link setup attempts in all E1 timeslots, and the other device is able to determine the E1 timeslot configuration according to the method described in the preceding embodiment.

The following takes a case where device A makes PPP link setup attempts in all E1 timeslots while device B performs timeslot self-discovery as an example.

As shown in FIG. 7, this embodiment includes:

Step 71: Device A makes PPP link setup attempts in all E1 timeslots.

For example, device A maps the HDLC frames that include the PPP link setup request packet to all timeslots of E1 frames, and sends them to device B through direct connection.

Step 72: Device B performs the timeslot self-discovery flow.

For example, device B consecutively receives M E1 frames, determines E1' and F', and determines the timeslot collection occupied by F' in E1' as the timeslot collection configured in E1 frames for HDLC frames. For the specific content, reference may be made to any preceding embodiments.

It needs to be noted that, as the intermediate path between device A and device B has been configured, among all E1 frames received by the peer device, only the timeslot data allowed by timeslot configuration is able to be received by the peer device, and the peer device is not able to receive timeslot data that is not allowed. The following takes a case where device A performs full timeslot configuration as an example. Even if HDLC frames are mapped to all timeslots of E1 frames at device A, suppose that the timeslot collection configured for the HDLC frames is TS1 to TS10, then the intermediate bearer network only allows TS1 to TS10 to pass through. Therefore, among the E1 frames received by device B, only the data of TS1 to TS10 is sent by device A.

The preceding takes the case where device A configures all timeslots while device B performs the timeslot self-discovery flow as an example. It may also be a case where device B configures all timeslots while device A performs the timeslot self-discovery flow. It may also be a case where device A and device B respectively configure all timeslots and perform the timeslot self-discovery flow. For example, in t1 time segment, both device A and device B configure all timeslots, and both send E1 frames where HDLC frames are mapped to all timeslots to each other; while in t2 time segment, both device A and device B perform timeslot self-discovery to determine timeslot configuration. Where, t1>t2.

The preceding t1>t2 is able to ensure that device A has the opportunity to make a PPP link setup attempt in all E1 timeslots while device B has the opportunity to detect E1 timeslot configuration in the transmission network; and, to ensure that device B has the opportunity to make a PPP link setup attempt in all E1 timeslots while device A has the opportunity to detect E1 timeslot configuration in the transmission network. Both ends in this embodiment are able to realize timeslot self-discovery. After the timeslot configuration in the transmission network changes, devices at both ends are able to automatically discover and update device configurations.

All the preceding embodiments take E1 as an example. For other TDM, reference may be made to these embodiments. For other TDM technologies, the following needs to be met: Suppose that the length of a PPP frames is L1 bytes, and the frame sending frequency is f1. The frame length of any TDM technology is L2 bytes and the frame sending frequency is f2. Then, only $L1 \times 9 \times f1 < L2 \times f2$ needs to be met so that each of the preceding embodiments is able to be used. At this time, there are a total of $L2 \times 8$ characteristic words.

Figure 9:
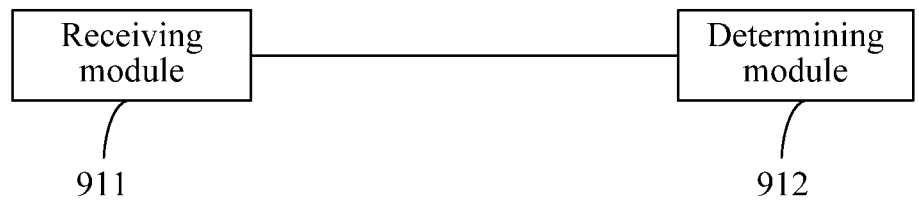
FIG. 9 is a schematic structural diagram of a device according to a sixth embodiment of the present invention.

FIG. 9 is a schematic structural diagram of a device according to the sixth embodiment of the present invention. The device includes a receiving module 911 and a determining module 912, where the receiving module 911 is configured to receive consecutively transmitted TDM frames, where at least one TDM frame among the consecutively transmitted TDM frames includes a characteristic word; and the determining module 912 is configured to determine, according to a case of a timeslot collection occupied by the characteristic word in the TDM frame, a timeslot collection configured in the TDM frame for HDLC frames, the characteristic word is configured to match a physical layer rate when no peer-peer protocol (PPP) link setup request packets are transmitted.

The device may specifically be a router, host, etc.

Optionally, a number of the consecutively transmitted TDM frames is M, M is any set value that is greater than N, and N is the maximum number of TDM frames required for transmitting one whole PPP link setup request. The determining module 912 includes: a first determining sub module, configured to: according to the M TDM frames, determine a first TDM frame and a first characteristic word, where the first TDM frame is a TDM frame that includes the largest number of a same characteristic word, and the first characteristic word is a characteristic word that occurs in the first TDM frame for a largest number of times; and a second determining sub module, configured to determine a timeslot collection occupied by the first characteristic word in the first TDM frame as a timeslot collection configured in the TDM frame for HDLC frames.

Optionally, the determining module 912 is specifically configured to: if there is a second TDM frame, the second TDM frame includes only one same characteristic word, and a timeslot collection occupied by the included same characteristic word is the same as a timeslot collection configured for HDLC, then determining the timeslot collection occupied by the characteristic word in the second TDM frame as a timeslot collection configured in the TDM frame for the HDLC frames.

The preceding characteristic words may be 8 characters obtained according to idle characters, for example, when the idle characters are 0x7E, the 8 characteristic words are 01111110, 11111100, 11111001, . . . , 00111111 respectively.

The following takes a case where the TDM frames are E1 frames as an example. Only one same characteristic word may be inserted into one E1 frame. The timeslot collection occupied by the same characteristic word is the timeslot collection configured for HDLC frames. Or, two different characteristic words may also be inserted into one E1 frame. Each same characteristic word occupies one or multiple timeslots. The timeslot collections occupied by the two characteristic words are the timeslot collection configured for the HDLC frames.

Figure 10:
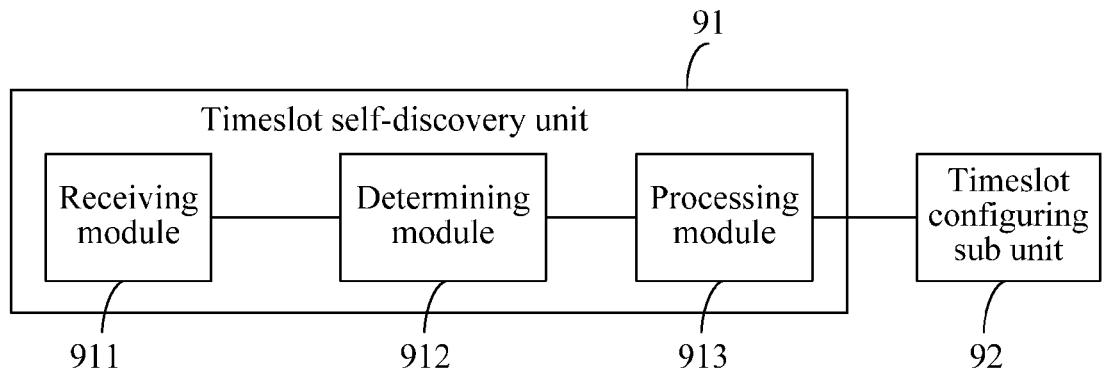
FIG. 10 is a schematic structural diagram of a device according to a seventh embodiment of the present invention.

Referring to FIG. 10, in another embodiment, this device includes a timeslot self-discovery unit 91, the above receiving module and determining module may be included in the timeslot self-discovery unit 91, and the device may further include a timeslot configuring sub unit 92. The timeslot self-discover unit 91 may further include a processing module 913, where the processing module 913 is configured to: according to the determined timeslot collection configured in the TDM frame for the HDLC frames, make a PPP link setup attempt; if the PPP link setup succeeds, report the determined timeslot collection configured in the TDM frame for the HDLC frames to the timeslot configuring sub unit 92; if PPP link setup fails, report a detection failure message to the timeslot configuring sub unit 92. The timeslot configuring sub unit 92 is configured to save the determined timeslot collection configured in the TDM frame for the HDLC frames, or, determine that detection for the timeslot collection configured in the TDM frame for the HDLC frames fails.

After knowing that detection succeeds, the timeslot configuring sub unit 92 may configure HDLC frames according to the timeslot collection occupied by the HDLC frames reported by the processing module, and then perform subsequent flows, for example, use the HDLC frames to bear PPP information for PPP link setup negotiation.

Figure 11:
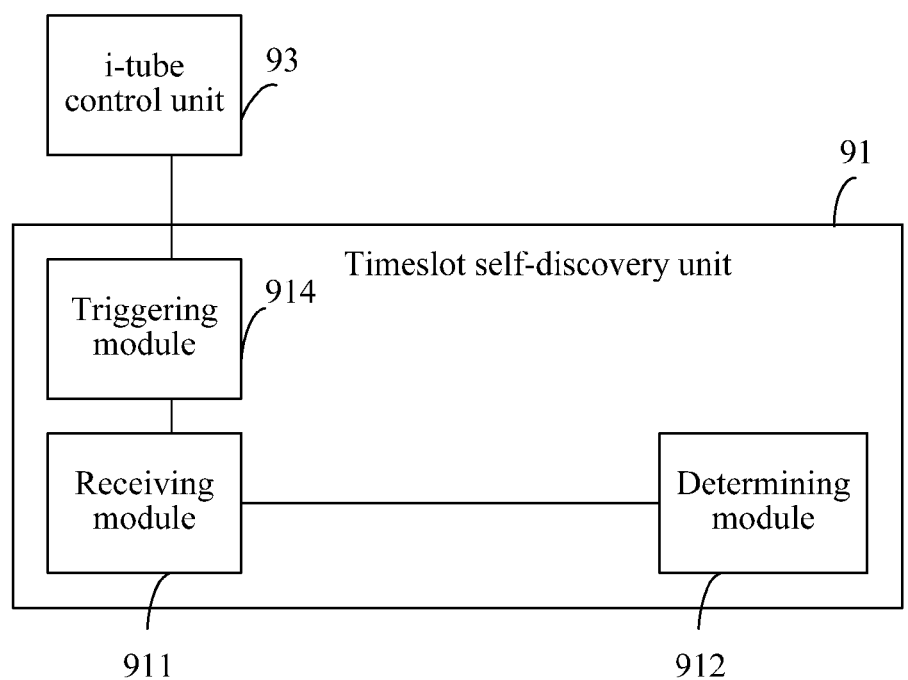
FIG. 11 is a schematic structural diagram of a device according to an eighth embodiment of the present invention.

Referring to FIG. 11, in another embodiment, the device may further include an i-tube control unit 93; the timeslot self-discovery unit 91 further includes a triggering module 914; the i-tube control unit 93 is configured to output a command for enabling a timeslot self-discovery function when PPP link setup does not succeed, and the triggering module 914 is configured to, after receiving the command for enabling the timeslot self-discovery function sent by the i-tube control unit, start the receiving module 911 and determining module 912.

Figure 12:
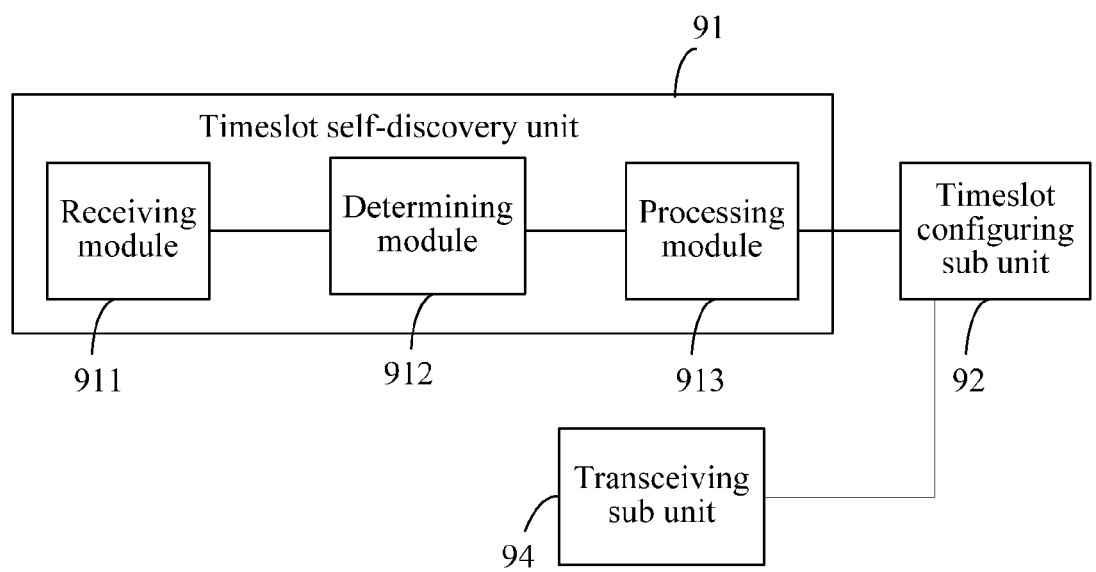
FIG. 12 is a schematic structural diagram of a device according to a ninth embodiment of the present invention.

Referring to FIG. 12, in another embodiment, the device may further include a transceiving sub unit 94. The transceiving sub unit 94 is configured to perform at least one of sending and receiving of E1 frames according to the timeslot configuration indication output by the timeslot configuring sub unit 92.

Optionally, the transceiving sub unit 94 may include the PPP protocol module, HDLC sending module, specified timeslot sending module, TDM frame sending module, TDM frame receiving module, specified timeslot receiving module, and HDLC receiving module.

The PPP protocol module is configured to receive an IP packet sent by an IP layer and upper-layer protocol unit, and encapsulate the IP packet to generate a PPP frame; the HDLC sending module is configured to, according to the timeslot configuration indication output by the timeslot configuring sub unit, encapsulate the PPP frame generated by the PPP protocol module into an HDLC frame. The specified timeslot sending module is configured to, according to the timeslot configuration indication output by the timeslot configuring sub unit, map the HDLC frame obtained by the HDLC sending module through encapsulation to a TDM frame. The TDM frame sending module is configured to send the TDM frame obtained by the specified timeslot sending module.

The TDM frame receiving module is configured to receive a TDM frame; the specified timeslot receiving module is configured to, according to the timeslot configuration indication output by the timeslot configuring sub unit, extract the HDLC frame from the TDM frame received by the TDM frame receiving module. The HDLC receiving module is configured to extract the PPP frame from the HDLC frame obtained by the specified timeslot receiving module through extraction. The PPP protocol module is further configured to realize PPP layer link setup negotiation according to the PPP frame obtained by the HDLC receiving module through extraction.

Further, the PPP protocol module may further be configured to determine a link state, and output a link status indication to the i-tube control unit 93, so that the i-tube control unit 93 determines, according to the link status indication, whether PPP link setup succeeds.

The three aspects of timeslot self-discovery, TDM frame sending, and TDM frame receiving may be respectively performed independently. No time sequence restriction exists for the steps among the aspects, so that independent evolution of timeslot self-discovery and data sending/receiving is realized. Of course, some of the above flows may also be mutually correlated. For example, during timeslot configuration self-discovery, the received E1 frames come from the E1 frame receiving module, that is, after receiving E1 frames, the E1 frame receiving module sends the received E1 frames to the specified timeslot receiving module and timeslot configuration self-discovery unit. The PPP link status indication output by the PPP protocol module may indicate the i-tube control unit, or may also indicate the timeslot configuring sub unit.

This flow includes the timeslot self-discovery function and data receiving/sending function. Both functions may be independently processed relatively. That is, both functions are in a loose coupling relationship. Independent evolution of the both functions is able to be realized respectively.

Further, the receiving module 911 is configured to receive consecutively transmitted TDM frames within a t2 time segment, where the TDM frames are sent by a peer end in a t1 time segment according to full TDM timeslot configuration, and t1>t2.

This flow may be applied in a scenario where devices at both ends of communication have not been complete configured. For example, both device A and device B have not been complete configured. Then both device A and device B need to determine timeslot configuration. At this time, at least one device is required to make PPP link setup attempts in all E1 timeslots, and the other device is able to determine the E1 timeslot configuration according to the method described in the preceding embodiment. For one of the timeslots, the transceiving sub unit is able to send TDM frames according to full TDM timeslot configuration in t1 time, and receive TDM frames in t2 time segment to determine timeslot configuration for the TDM frames.

In the preceding embodiment, when the TDM frames are E1 frames, and the length of the PPP link setup request packet is L1 bytes, the M is any set value that is greater than or equal to L1+1.

By detecting consecutive E1 frames, and determining timeslot configuration according to the characteristic words included in the E1 frames, this embodiment is able to avoid problems caused by manual pre-configuration, realize self-discovery of E1 timeslot configuration, realize true remote automatic site deployment through IPoverTDM, lower the requirements for preparations before site deployment of remote devices, reduce the requirements for in situ site deployment skills, shorten the site deployment time, and reduce the site deployment cost.

Since timeslot self-discovery requires no manual configuration during site maintenance, it is able to realizes true remote site maintenance through IPoverTDM. Through timeslot self-discovery, it is able to obtain the timeslot configuration of E1 frames automatically. Further PPP negotiation may be performed according to the automatically obtained timeslot configuration of E1 frames to determine whether the automatically obtained timeslot configuration of E1 frames is correct. When the timeslot configuration of the transmission network changes, the devices at both ends are also able to automatically update device configuration through timeslot self-discovery.

It may be understood that, related features in the method and device may be referenced mutually. In addition, "first" and "second" in the preceding embodiments are configured to distinguish embodiments, but do not represent superiority or inferiority of all embodiments.

It is understandable to those ordinary skilled in the art that all or certain steps in the preceding embodiments of the present invention may be performed by instructing related hardware through a program. The program may be stored in a storage medium that can be read by a computer. When being executed, the program performs the steps in the preceding embodiments of the present invention. The storage medium may be a medium that is able to store program codes, such as ROM, RAM, magnetic disk, or compact disk, etc.

The preceding embodiments are intended to describe the technical solutions revealed in the present invention but not to confine the invention. Although the present invention has been detailed described with reference to the preceding embodiments, it is understandable to those ordinary skilled in the art that modifications or equivalent replacements may be made on the technical solutions provided in embodiments of the present invention without departing from the spirit and scope of the technical solutions provided in the present invention.

What is claimed is:

1. A method for determining timeslot configuration in time division multiplexing (TDM) transmission, the method comprising:
   receiving consecutively transmitted TDM frames, wherein at least one TDM frame among the consecutively transmitted TDM frames includes a characteristic word; and
   according to a case of a timeslot collection occupied by the characteristic word in the TDM frame, determining a timeslot collection configured in the TDM frame for high level data link control (HDLC) frames, wherein the characteristic word is configured to match a physical layer rate when no peer-peer protocol (PPP) link setup request packets are transmitted.

2. The method according to claim 1, wherein a number of the consecutively transmitted TDM frames is M, where M is any set value that is greater than N and N is a maximum number of TDM frames required for transmitting one whole PPP link setup request; and
   wherein determining the timeslot collection comprises:
      according to the M TDM frames, determining a first TDM frame and a first characteristic word, wherein the first TDM frame is a TDM frame that includes the largest number of a same characteristic word, and the first characteristic word is the characteristic word that occurs in the first TDM frame for a largest number of times; and
      determining a timeslot collection occupied by the first characteristic word in the first TDM frame as a timeslot collection configured in the TDM frame for HDLC frames.

3. The method according to claim 2, wherein determining the timeslot collection comprises: if a second TDM frame exists, the second TDM frame comprises only same characteristic word, and a timeslot collection occupied by the comprised same characteristic word is the same as a timeslot collection configured for HDLC, then determining the timeslot collection occupied by the characteristic word in the second TDM frame as a timeslot collection configured in the TDM frame for the HDLC frames.

4. The method according to claim 1, wherein, after determining the timeslot collection configured in the TDM frame for HDLC frames according to a case of a timeslot collection occupied by the characteristic word in the TDM frame, the method further comprises:
   making a PPP link setup attempt according to the determined timeslot collection configured in the TDM frame for the HDLC frames;
   if the PPP link setup succeeds, saving the determined timeslot collection configured in the TDM frame for the HDLC frames; and
   if PPP link setup fails, determining that detection for the timeslot collection configured in the TDM frame for the HDLC frames fails.

5. The method according to claim 2, wherein, after determining the timeslot collection configured in the TDM frame for HDLC frames according to a case of a timeslot collection occupied by the characteristic word in the TDM frame, the method further comprises:
   making a PPP link setup attempt according to the determined timeslot collection configured in the TDM frame for the HDLC frames;
   if the PPP link setup succeeds, saving the determined timeslot collection configured in the TDM frame for the HDLC frames; and
   if PPP link setup fails, determining that detection for the timeslot collection configured in the TDM frame for the HDLC frames fails.

6. The method according to claim 1, wherein before receiving the consecutively transmitted at least one TDM frames, the method further comprises: determining a PPP link state and enabling a timeslot self-discovery function when the PPP link state indicates that PPP link setup does not succeed, so that after the timeslot self-discovery function is enabled, consecutively transmitted TDM frames are received, and a timeslot collection configured in the TDM frame for the HDLC frames is determined according to a case of a timeslot collection occupied by the characteristic word in the TDM frame.

7. The method according to claim 2, wherein, before receiving the consecutively transmitted at least one TDM frames, the method further comprises:
   determining a PPP link state and enabling a timeslot self-discovery function when the PPP link state indicates that PPP link setup does not succeed, so that after the timeslot self-discovery function is enabled, consecutively transmitted TDM frames are received, and a timeslot collection configured in the TDM frame for the HDLC frames is determined according to a case of a timeslot collection occupied by the characteristic word in the TDM frame.

8. The method according to claim 1, further comprising:
acquiring a timeslot configuration indication, and performing at least one of sending and receiving of TDM frames according to the timeslot configuration indication;
wherein performing the sending of TDM frames comprises:
receiving an IP packet sent by an IP layer and upper-layer protocol unit, and encapsulating the IP packet into a PPP frame;
encapsulating the PPP frame into an HDLC frame according to the timeslot configuration indication;
mapping the HDLC frame to a TDM frame according to the timeslot configuration indication; and
sending the TDM frame;
wherein performing the receiving of TDM frames comprises:
receiving a TDM frame from an external source;
extracting the HDLC frame from the TDM frame according to the timeslot configuration indication;
extracting the PPP frame from the HDLC frame; and
realizing PPP layer link setup negotiation according to the PPP frame.

9. The method according to claim 2, further comprising:
acquiring a timeslot configuration indication, and performing at least one of sending and receiving of TDM frames according to the timeslot configuration indication;
wherein performing the sending of TDM frames further comprises:
receiving an IP packet sent by an IP layer and upper-layer protocol unit:
encapsulating the IP packet into a PPP frame;
encapsulating the PPP frame into an HDLC frame according to the timeslot configuration indication;
mapping the HDLC frame to a TDM frame according to the timeslot configuration indication; and
sending the TDM frame;
wherein performing the receiving of TDM frames further comprises:
receiving a TDM frame from externally;
extracting the HDLC frame from the TDM frame according to the timeslot configuration indication;
extracting the PPP frame from the HDLC frame; and
realizing PPP layer link setup negotiation according to the PPP frame.

10. The method according to claim 1, wherein receiving consecutively transmitted TDM frames comprises receiving consecutively transmitted TDM frames within a t2 time segment, wherein the TDM frames are sent by a peer end in a t1 time segment according to full TDM timeslot configuration, and t1>t2.

11. The method according to claim 2, wherein the TDM frames are E1 frames and a length of a PPP link setup request packet is L1 bytes and wherein the M is any set value that is greater than or equal to L1+1.

12. A device for determining timeslot configuration in time division multiplexing (TDM) transmission, the device comprising:
a receiver, configured to receive consecutively transmitted TDM frames, wherein at least one TDM frame among the consecutively transmitted TDM frames includes a characteristic word; and
a controller, configured to determine, according to a case of a timeslot collection occupied by the characteristic word in the TDM frame, a timeslot collection configured in the TDM frame for high level data link control (HDLC) frames, where the characteristic word is configured to match a physical layer rate when no peer-peer protocol (PPP) link setup request packets are transmitted.

13. The method according to claim 12, wherein a number of the consecutively transmitted TDM frames is M, where M is any set value that is greater than N and N is a maximum number of TDM frames required for transmitting one whole PPP link setup request, and wherein the controller comprises:
a first subcontroller, configured to determine a first TDM frame and a first characteristic word according to the M TDM frames, wherein the first TDM frame is a TDM frame that includes the largest number of a same characteristic word and the first characteristic word is a characteristic word that occurs in the first TDM frame for a largest number of times; and/or,
a second subcontroller, configured to determine a timeslot collection occupied by the first characteristic word in the first TDM frame as a timeslot collection configured in the TDM frame for HDLC frames.

14. The device according to claim 12, wherein the controller is specifically configured to determine the timeslot collection occupied by the characteristic word in the TDM frame as a timeslot collection configured in the TDM frame for the HDLC frames, if there is a second TDM frame, the second TDM frame comprises only a same characteristic word, and a timeslot collection occupied by the comprised same characteristic word is the same as a timeslot collection configured for HDLC.

15. The device according to claim 12, further comprising:
a first processor configured to make a PPP link setup attempt according to the determined timeslot collection configured in the TDM frame for the HDLC frames and, if the PPP link setup succeeds, to report the determined timeslot collection configured in the TDM frame for the HDLC frames to the second processor and, if PPP link setup fails, to report a detection failure message to the second processor; and
a second processor configured to save the determined timeslot collection configured in the TDM frame for the HDLC frames or to determine that detection for the timeslot collection configured in the TDM frame for the HDLC frames fails.

16. The device according to claim 13, further comprising:
a first processor configured to make a PPP link setup attempt according to the determined timeslot collection configured in the TDM frame for the HDLC frames and, if the PPP link setup succeeds, to report the determined timeslot collection configured in the TDM frame for the HDLC frames to the second processor and, if the PPP link setup fails, to report a detection failure message to the second processor; and
a second processor configured to save the determined timeslot collection configured in the TDM frame for the HDLC frames or to determine that detection for the timeslot collection configured in the TDM frame for the HDLC frames fails.

17. The device according to claim 12, further comprising:
an i-tube controller configured to output a command for enabling a timeslot self-discovery function when PPP link setup does not succeed; and
a trigger configured to start the receiver and the controller after receiving the command for enabling the timeslot self-discovery function sent by the i-tube controller.

18. The device according to claim 13, further comprising:
an i-tube controller configured to output a command for enabling a timeslot self-discovery function when PPP link setup does not succeed; and
a trigger configured to start the receiver and the controller after receiving the command for enabling the timeslot self-discovery function sent by the i-tube controller.

19. The device according to claim 15, further comprising a transceiver, configured to perform at least one of sending and receiving of E1 frames according to the timeslot configuration indication output by the second processor.

20. The device according to claim 19, wherein the transceiver comprises:
a PPP protocol processor, configured to receive an IP packet sent by an IP layer and upper-layer protocol unit and to encapsulate the IP packet to generate a PPP frame;
an HDLC transmitter, configured to encapsulate the PPP frame generated by the PPP protocol processor into an HDLC frame according to the timeslot configuration indication output by the second processor;
a specified timeslot transmitter, configured to map the HDLC frame obtained by the HDLC transmitter through encapsulation to a TDM frame according to the timeslot configuration indication output by the second processor;
a TDM frame transmitter, configured to send the TDM frame obtained by the specified timeslot transmitter;
a TDM frame receiver, configured to receive a TDM frame from an external source;
a specified timeslot receiver, configured to extract the HDLC frame from the TDM frame received by the TDM frame receiver according to the timeslot configuration indication output by the second processor; and
an HDLC receiver, configured to extract the PPP frame from the HDLC frame obtained by the specified timeslot receiver through extraction;
wherein the PPP protocol processor is further configured to realize PPP layer link setup negotiation according to the PPP frame obtained by the HDLC receiver through extraction.

21. The device according to claim 12, wherein the receiver is specifically configured to receive consecutively transmitted TDM frames within a t2 time segment, wherein the TDM frames are sent by a peer end in a t1 time segment according to full TDM timeslot configuration, and t1>t2.

* * * * *